R. WELLS.
APPARATUS FOR EXTRACTING OILS AND THE LIKE.
APPLICATION FILED APR. 23, 1915.
1,272,744.
Patented July 16, 1918.
2 SHEETS—SHEET 1.
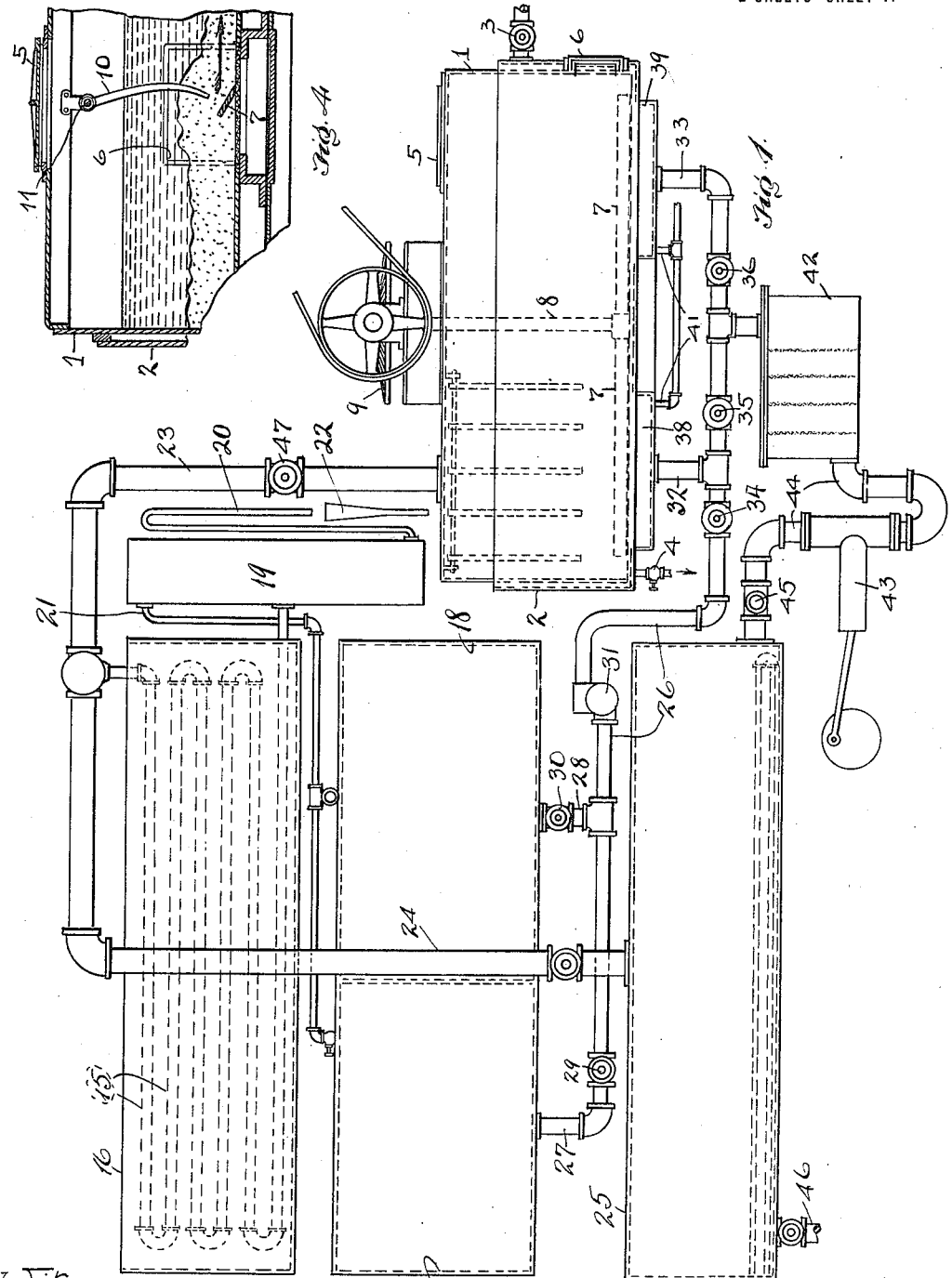

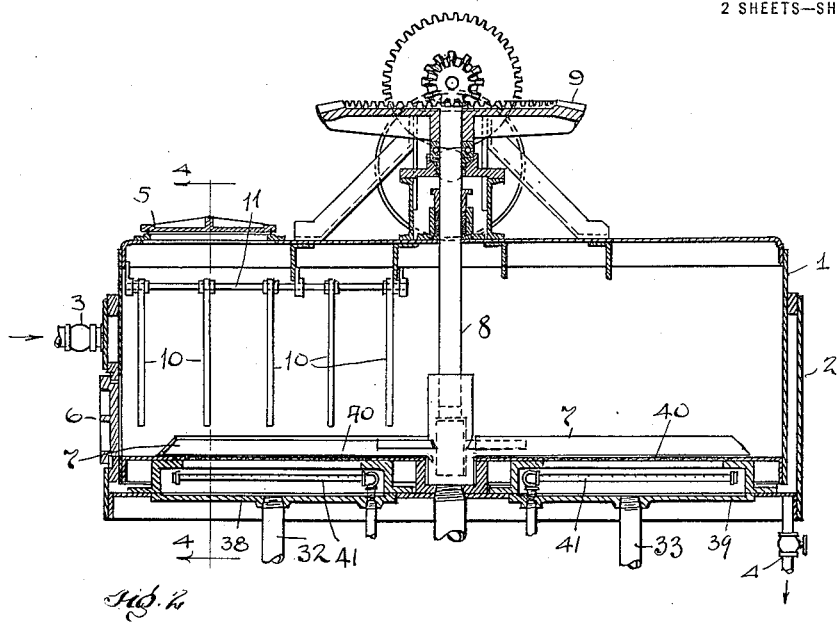
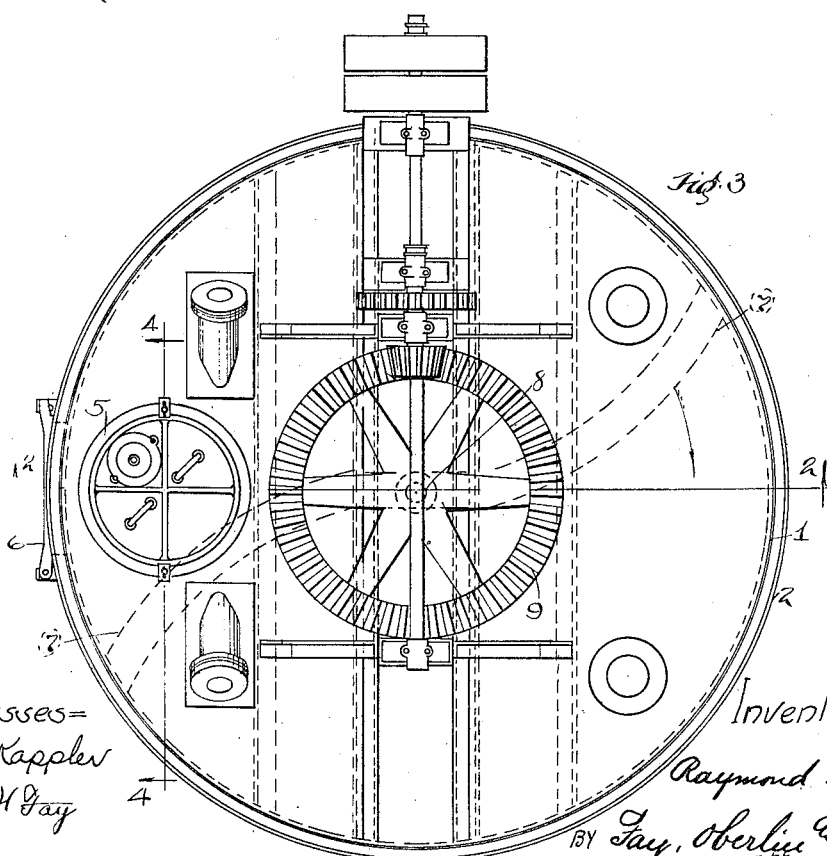

UNITED STATES PATENT OFFICE.

RAYMOND WELLS, OF HOMER, NEW YORK, ASSIGNOR TO COBWELL CORPORATION, OF CLEVELAND, OHIO, A CORPORATION OF VIRGINIA.

APPARATUS FOR EXTRACTING OILS AND THE LIKE.

1,272,744. Specification of Letters Patent. Patented July 16, 1918.

Application filed April 23, 1915. Serial No. 23,475.

*To all whom it may concern:*

Be it known that I, RAYMOND WELLS, a citizen of the United States, and a resident of Homer, county of Cortland, State of New York, have invented a new and useful Improvement in Apparatus for Extracting Oils and the like, of which the following is a specification, the principle of the invention being herein explained and the best mode in which I have contemplated applying that principle, so as to distinguish it from other inventions.

The present improved apparatus for extracting oils and the like is designed more particularly for use in the rendering, drying, and disposal of materials in which the oils, greases or the like to be extracted are found in conjunction with a smaller or larger amount of water. Such method of disposal, in other words, is particularly adapted for the treatment of municipal garbage, abattoir, and rendering house offals, and refuse and raw material of fish, vegetable or meat canneries. As indicated, however, the invention is not limited to the treatment of the particular materials named, but is equally adaptable for the extraction of the essential oils from seeds, beans and other oil bearing vegetable substances.

The object of the present invention is to provide an apparatus which will permit of the elimination of the water without "boiling down" the original mass, and which will enable such elimination and the subsequent extraction of the desired oils and greases to be carried on in one and the same chamber, viz., that in which the raw material is originally placed. In this way, not only is the re-handling of the raw material avoided during the course of treatment, but I avoid entirely the production of the pasty, sticky mass referred to above, and the residue left after treatment is capable of being conveniently handled. The apparatus, moreover, is capable of construction and use in units of relatively small size, each of which operates with the same degree of efficiency, and with the same expedition as would a larger plant. To the accomplishment of the foregoing and related ends, the invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

In said annexed drawings:—

Figure 1 is a side elevational view, more or less diagrammatic in character, of my approved apparatus; Fig. 2 is a central vertical section of the reduction chamber forming part of such apparatus; Fig. 3 is a plan view of such chamber; and Fig. 4 is a broken sectional view of the same taken on a plane at right angles to that of Fig. 2, as indicated by the section lines 4—4 on said Fig. 2 and on Fig. 3.

Referring now to the illustrative apparatus shown in several figures of the drawings just described, it will be seen that I provide for the reception of the material to be treated a reduction chamber shown best in Figs. 2 and 3, in the form of a flat shallow receptacle 1 of circular outline, the size of which will depend of course upon the amount of the material which it is desired to treat at one time, that is at a single batch. The bottom and side walls of this chamber are inclosed in a supplemental chamber or jacket 2 to which steam or other equivalent heating medium may be admitted from a supply pipe 3, a drain pipe 4 being provided for the removal of any water of condensation in the case of steam, or to complete the circuit in the case of a non-condensable medium. The chamber 1 is provided in its top with a manhole 5, through which the material to be treated may be supplied, and at a convenient point in its side wall with a second manhole 6, through which the material may be removed after the treatment is completed.

For manipulating the material after it has been thus placed in the chamber for treatment, and a quantity of solvent medium introduced as will be presently described, a pair of radially extending curved arms 7 are provided, being carried by a vertical shaft 8, the upper end of which extends above the top of the chamber where it is connected with suitable driving means 9. The form of these arms 7 is shown in plan in Fig. 3, and in transverse section in Fig. 4, from which latter figure it will be seen that they incline like a plow share and fit the bottom of the chamber closely, so that their only effect as they are rotated is to slide along such bottom and lift successive portions of the layer of material as they pass thereunder and thus impart an undulatory movement to such layer. In other words, these arms do not cut through the material in any sense.

As a coöperative agency with the aforesaid arms I provide a series of pivotal arms 10 disposed at spaced intervals along a radially extending shaft 11 as shown in Fig. 2, the lower ends of such arms being curved and dangling freely as shown in Fig. 4. The length of the arms is made such that their lower ends will engage the layer of material as the latter is undulated and carried in the general circular direction indicated by the arrow in Fig. 3, more or less stirring up the upper surface of such layer. These arms, however, as in the case of the radial rotating arms 7, obviously do not cut through the material.

Supported, preferably at a higher level than the chamber is a condenser consisting of several coils of pipe 15 in a suitable cooling tank 16, and below said condenser is a liquid storage tank or chamber, or rather a pair of such chambers 17 and 18, formed by dividing the larger chamber into two by means of a transverse partition. The discharge end of the condenser coil 15 is connected with a gravity separator 19 which is adapted to overflow from its upper end through a pipe 20 into either of said storage chambers, a siphon overflow pipe 21 being connected with the lower end of said separator, and discharging into a waste pipe 22.

The condenser is connected by means of one pipe 23 with the reduction chamber, and by means of another pipe 24 with a still 25, the function of which latter will presently appear. The two storage tanks 17 and 18 are adapted to discharge their contents into the reduction chamber 1 through a pipe line 26 having branched connections 27 and 28 with said chambers respectively. Such connections are in turn respectively controlled by valves 29 and 30 and said line 26 further has a pump 31 therein so as to assist or substitute for such flow as might occur under the influence of gravity alone. Branched connections 32 and 33 are similarly provided between the other end of this pipe and said reduction chamber which are controlled by valves 34, 35 and 36, as shown, these connections entering the bottom of the chamber through supplemental chambers 38 and 39, respectively, as shown in Figs. 1 and 2, which are separated from the interior of the chamber by foraminous partitions 40, and are of sufficient size to receive open steam supply pipes 41. Connected with said pipe 26 between branched connections 32 and 33 is a strainer or mud-drum 42, which is in turn connected with the still 25 previously referred to, a suction pump 43 being interposed in the connecting line 44 which is further controlled by a suitable valve 45.

By means of the foregoing arrangement of connections between the storage tanks 17 and 18 and reduction chamber 1, and between the latter and the still 25, it will be observed that solvent from either of said storage tanks may be supplied to the reduction chamber by means of the pipe 26, branched connection 32 and supplemental chamber 38, the pump 31 being utilized to force such liquid into the chamber against gravity or against any vapor pressure which may exist in said chamber. Similarly the chamber may be drained through both connections 32 and 33 simultaneously and then through the mud-drum 42 into said still 25 such draining action being facilitated or induced by the suction pump 43 in the line 44 connecting said drum with said still.

The general mode of operation of the foregoing apparatus in carrying out my improved method or process of extraction need be only briefly set forth, in view of the description heretofore given of the several stages of said method incidentally to describing the several parts of the apparatus.

The material to be treated is placed in the reduction chamber 1 so as to provide a relatively thin layer of uniform thickness. Then the solvent selected for preliminarily treating the material is flowed into said chamber from the corresponding storage tank to totally immerse such material. Steam being now admitted or having been previously admitted to the jacket and the stirring device having been set in motion, the material and such solvent are thoroughly commingled and as soon as a temperature is reached such as to cause the combined vapor pressures of such solvent and the water contained in the material to equal the pressure above the mass, water and solvent will begin to pass over into the condenser 15. From the condenser such water and solvent, again restored to liquid form, pass to the separator 19 where they are separated, the water overflowing to waste and the solvent back to its appropriate storage tank. As the liquid level in the reduction chamber falls, more of such solvent is added from time to time, or preferably continuously by the action of the pump 31, so as to maintain the body thereof in the chamber substantially constant. When it is found that the water is substantially entirely driven off, the foregoing operation is stopped, the connections between the chamber and the condenser and storage tank respectively closed, and the body of solvent in said chamber withdrawn through the supplemental chambers 38 and 39 and mud-drum 42 into the still 25. Such body of sovent will carry with it the major portion of the oil, grease or other ingredient to be extracted, and is separated from the latter in the still by being boiled off, the solvent vapors being carried to the condenser and thence returned to the proper chamber, as will be readily understood.

Thereupon the connections between the chamber and the still are again closed and a supply of solvent from the other storage tank admitted into the chamber, there mixed with the residual material and then withdrawn through the mud drum to the still, washing out incidentally a further portion of the oil or grease in such materials. The material may be subjected to as many successive washings as found desirable until in the end practically all of the oil or grease therein has been extracted, the solvent being distilled off as desired, condensed and returned to its appropriate storage tank, so as to be used over and over again. The oil or grease collecting in the still may of course be withdrawn, whenever desired, through a discharge pipe 46 provided for the purpose.

It remains to recover from the residual material in the chamber the solvent which may be absorbed therein, and to this end steam is supplied to the jacket until a higher temperature than previously used is attained. Accordingly, when any steam is introduced through the connections 41 and supplemental chambers 38 and 39, such steam is not condensed upon coming in contact with the material, but remains volatile, at the same time vaporizing the solvent in such material and carrying the same along into the condenser 15, the valve 47 in the line 23 being open for this purpose. There remains finally only dry steam in the chamber, and before this is condensed the material is removed by opening the man-hole 6 in the side wall.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus of the character described, the combination of a reduction chamber of general cylindrical shape; a central vertical shaft therein; exterior driving means for said shaft; radially extending arms carried by said shaft close to the bottom of said chamber only; and depending independently pivotally supported arms in said chamber adapted to engage the material being treated as the latter is undulated by said radial arms.

2. In apparatus of the character described, the combination of a reduction chamber of general cylindrical shape; a central vertical shaft therein; exterior driving means for said shaft; radially extending arms carried by said shaft close to the bottom of said chamber only; and a series of arms depending independently in said chamber, said arms being pivotally supported at intervals along a radius of said chamber and being adapted to engage the upper surface of the mass of material being treated as the latter is undulated by said radial arms.

3. In apparatus of the character described, the combination of a reduction chamber of general cylindrical shape; a central vertical shaft therein; exterior driving means for said shaft; radially extending arms carried by said shaft close to the bottom of said chamber only; a radially extending shaft fixed in the upper part of said chamber; and a series of arms pivotally supported at intervals on said shaft so as to depend freely therefrom, the lower ends of said arms being recurved and arranged to engage the upper surface of the mass of material being treated as the latter is undulated by said radial arms.

Signed by me, this 21st day of April, 1915.

RAYMOND WELLS.

Attested by—
EDWARD L. WEBB,
LEON P. RANDALL.